(12) United States Patent
Zhu et al.

(10) Patent No.: US 8,176,419 B2
(45) Date of Patent: May 8, 2012

(54) SELF LEARNING CONTEXTUAL SPELL CORRECTOR

(75) Inventors: Weibin Zhu, Beijing (CN); Haiyun Xu, Shanghai (CN); Mingyu Wang, Beijing (CN); Li Rong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1037 days.

(21) Appl. No.: 11/959,946

(22) Filed: Dec. 19, 2007

(65) Prior Publication Data

US 2009/0164890 A1 Jun. 25, 2009

(51) Int. Cl.
*G06F 17/00* (2006.01)

(52) U.S. Cl. ........................................ 715/257

(58) Field of Classification Search ................ 715/257
See application file for complete search history.

(56) References Cited

U.S. PATENT DOCUMENTS

| | | | | |
|---|---|---|---|---|
| 4,701,851 A * | 10/1987 | Bass et al. | | 715/257 |
| 4,777,617 A * | 10/1988 | Frisch et al. | | 704/8 |
| 5,956,739 A | 9/1999 | Golding et al. | | |
| 6,144,958 A * | 11/2000 | Ortega et al. | | 707/713 |
| 6,853,993 B2 | 2/2005 | Ortega et al. | | |
| 6,918,086 B2 | 7/2005 | Rogson | | |
| 7,047,493 B1 | 5/2006 | Brill et al. | | |
| 7,076,731 B2 * | 7/2006 | Brill et al. | | 715/257 |
| 7,194,684 B1 | 3/2007 | Shazeer | | |
| 7,207,004 B1 | 4/2007 | Harrity | | |
| 7,243,305 B2 | 7/2007 | Schabes et al. | | |
| 7,254,774 B2 | 8/2007 | Cucerzan et al. | | |
| 7,289,982 B2 * | 10/2007 | Saito et al. | | 1/1 |
| 7,444,324 B2 * | 10/2008 | Ortega et al. | | 1/1 |
| 7,496,562 B2 * | 2/2009 | Suzuki et al. | | 1/1 |
| 7,584,093 B2 * | 9/2009 | Potter et al. | | 704/9 |
| 7,647,554 B2 * | 1/2010 | Pickover et al. | | 715/257 |
| 7,664,740 B2 * | 2/2010 | Starbuck et al. | | 707/999.003 |
| 7,904,452 B2 * | 3/2011 | Kasano et al. | | 707/730 |
| 2002/0116398 A1 * | 8/2002 | Sugaya et al. | | 707/200 |
| 2005/0071325 A1 * | 3/2005 | Bem | | 707/3 |
| 2005/0071365 A1 * | 3/2005 | Hou et al. | | 707/102 |
| 2005/0091033 A1 * | 4/2005 | Valdes et al. | | 704/5 |
| 2005/0283726 A1 * | 12/2005 | Lunati | | 715/533 |
| 2006/0167676 A1 | 7/2006 | Plumb | | |
| 2006/0224580 A1 * | 10/2006 | Quiroga et al. | | 707/5 |
| 2006/0241944 A1 * | 10/2006 | Potter et al. | | 704/254 |
| 2007/0040813 A1 * | 2/2007 | Kushler et al. | | 345/173 |
| 2007/0129935 A1 * | 6/2007 | Uchimoto et al. | | 704/9 |
| 2007/0162379 A1 * | 7/2007 | Skinner | | 705/37 |
| 2007/0208732 A1 * | 9/2007 | Flowers et al. | | 707/5 |
| 2007/0271255 A1 * | 11/2007 | Pappo | | 707/5 |
| 2008/0010316 A1 * | 1/2008 | Liao et al. | | 707/104.1 |
| 2008/0015844 A1 * | 1/2008 | Fux et al. | | 704/10 |
| 2008/0147381 A1 * | 6/2008 | Yu et al. | | 704/9 |
| 2008/0154600 A1 * | 6/2008 | Tian et al. | | 704/251 |
| 2008/0155399 A1 * | 6/2008 | Kock | | 715/259 |

(Continued)

OTHER PUBLICATIONS

Kellerman, Recognition of Misspelled Keywords, Google 1973, pp. 1-3.*

(Continued)

*Primary Examiner* — Cong-Lac Huynh

(57) ABSTRACT

A group of keywords are received, wherein each keyword includes one or more words. A word list is formed from the group of keywords, where the word list includes a list of each word in the group of keywords. A misspelled keyword is corrected using analysis of the words in the word list. The corrected keyword is output.

18 Claims, 7 Drawing Sheets

U.S. PATENT DOCUMENTS

| | | | |
|---|---|---|---|
| 2009/0077180 A1* | 3/2009 | Flowers et al. | 709/206 |
| 2009/0092340 A1* | 4/2009 | Arguelles | 382/306 |
| 2009/0138296 A1* | 5/2009 | Geiger | 705/7 |
| 2009/0164300 A1* | 6/2009 | Gupta et al. | 705/10 |
| 2009/0177463 A1* | 7/2009 | Gallagher et al. | 704/10 |
| 2010/0161318 A1* | 6/2010 | Lowles et al. | 704/10 |
| 2011/0022952 A1* | 1/2011 | Wu et al. | 715/257 |
| 2011/0131207 A1* | 6/2011 | Jonsson | 707/730 |

OTHER PUBLICATIONS

Durham et al., Spelling Correction in User Interface, Google 1983, pp. 764-773.*

Yih et al., Finding Advertising Keywords on Web Pages, ACM 2006, pp. 213-222.*

Cheng et al., SpellChef: Spelling Checker and Corrector for Filipino, Google Dec. 2007, pp. 73-80.*

Zaharia et al., Finding Content in File-Sharing Networks When You Can't Even Spell, Google 2007, pp. 1-6.*

Hazen et al. A comparison and Combination of Methods for OOV Word Detection and Word Confidence Scoring, Google 2001, p. 397-400.*

Hodge et al., a Comparison of a Novel Neural Spell Checker and Standard Spell Checking Algorithm, Google 2002, pp. 2571-2580.*

Tokuda et al., An Online Tutoring System for Language Translation, IEEE 2001, pp. 46-55.*

Ruch et al., Evaluating and Reducing the Effect of Data Corruption when Applying Bag of Words Approachs to Medical Records, Google 2001, pp. 1-10.*

Martins, et al., "Spelling Correction for Search Engine Queries" ,vol. 3230, Springer Berlin / Heidelberg, 2004, pp. 12.

Schaback, et al., "Multi-Level Feature Extraction for Spelling Correction" , International Joint Conference on Artificial Intellignece'07, 2007, pp. 79-86.

Seth, et al., "SSCS: A Smart Spell Checker System Implementation Using Adaptive Software Architecture" , 2001, pp. 1-12.

McCoy, S. et al.; "The effects of online advertising"; Communications of the ACM, Emergency response information systems: emerging trends and technologies; vol. 50, Issue 3; mar. 2007; pp. 84-88.

"IAB Landmark Study Demonstrates Web Ad Banner Effectiveness"; Sep. 24, 1997; retrieved at http://www.iab.net/about_the_iab/recent_press_releases/press_release_archive/press_release/4287.

Xing, B. et al.; "The impact of search engine optimization on online advertising market"; ICEC'06: Proceedings of the 8th International Conference on Electronic Commerce; Aug. 2006; New York, New York; pp. 519-529.

Weideman, M. et al.; "An investigation into search engines as a form of targeted advert delivery"; SAICSIT'02 Proceedings of the 2002 annual research conference of the South African institute of computer scientists and information technologists on Enablement through technology; Sep. 2002; Republic of South Africa; pp. 258.

Caufield, J.; "Where Did Google Get Its Value?"; Libraries and the Academy; vol. 5, No. 4; Oct. 2005; pp. 555-572.

Sen, R.; "Optimal Search Engine Marketing Strategy"; International Journal of Electronic Commerce; vol. 10, Issue 1, No. 1; Fall 2005, pp. 9-25.

Borgs, C. et al.; "Dynamics of bid optimization in online advertisement auctions"; WWW'07 Proceedings of the 16th international conference on World Wide Web; May 2007; pp. 531-540; New York, New York.

McLuhan, R.; "Search for a top ranking"; Marketing; Oct. 19, 2000; p. 47.

Dewan, R., et al.; "Managing web sites for profitability: Balancing content and advertising"; Technical Report, Working Paper No. CIS 01-04; University of Rochester, Jul. 6, 2001.

Mehta, A. et al.; "AdWords and Generalized On-line Matching"; FOCS'05 Proceedings of the 46th Annual IEEE Symposium on Foundations of Computer Science; Oct. 23-25, 2005; pp. 264-273.

Glantz, H; "On the recognition of information with a digital computer"; Journal of the ACM; vol. 4, Issue 2; Apr. 1957; pp. 178-188.

Damerau, F.; "A technique for computer detection and correction of spelling errors"; In Communications of the ACM; vol. 7, Issue 3; Mar. 1964; pp. 171-176.

Wagner, R.; The String-to-String Correction Problem; Journal of ACM; vol. 21, No. 1; Jan. 1974; pp. 168-173.

McIlroy, M.; "Development of a spelling list"; In IEEE Transactions on Communications; vol. 30, No. 1; 1982; pp. 91-99.

Heidorn, G., et al.; "The EPISTLE text-critiquing system"; IBM Systems Journal; vol. 21, No. 3; 1982; pp. 305-326.

Mays, E. et al.; "Context based spelling correction"; Journal of Information Processing and Management; vol. 27, Issue 5; 1991; pp. 517-522.

Golding, A.; "A Bayesian hybrid method for context-sensitive spelling correction"; Proceedings of the 3rd Workshop on Very Large Corpora; vol. 3; 1995; pp. 39-53.

Golding, A. et al.; "Applying Winnow to Context-Sensitive Spelling Correction"; Proceedings of ICML 1996, pp. 182-190.

Mangu, L. et al.; "Automatic Rule Acquisition for Spelling Correction"; Proceedings of the 14th International Conference on Machine Learning; 1997, pp. 734-741.

Ruch, P. et al.; "Toward filling the gap between interactive and fully-automatic spelling correction using the linguistic context"; 2001 IEEE International Conference on Systems, Man, and Cybernetics; vol. 1; Oct. 7-10, 2001; pp. 199-204.

Cucerzan, S. et al.; "Spelling correction as an iterative process that exploits the collective knowledge of web users"; Proceedings of EMNLP'04; Barcelona, Spain; 2004; pp. 293-300.

Frakes, W. et al.; "Strength and Similarity of Affix Removal Stemming Algorithms"; ACM SIGIR Forum; vol. 37, Issue 1; 2003; pp. 26-30.

Hafer, M. et al.; "Word segmentation by letter successor varieties"; Information Storage and Retrieval; vol. 10, Issues 11-12; Nov.-Dec. 1974; pp. 371-385.

Xu, J. et al.; "Corpus-Based Stemming using Co-occurrence of Word Variants"; ACM Transactions on Information Systems (TOIS); vol. 16, Issue 1; Jan. 1998; pp. 61-81.

Porter, M. et al.; Relevance Feedback in a Public Access Catalogue for a Research Library; Program; vol. 22, No. 1; Jan. 1988; pp. 1-20.

Gan, K. et al.; "A Statistically Emergent Approach for Language Processing: Application to Modeling Context Effects in Ambiguous Chinese Word Boundary Perception"; Journal of Computational Linguistics; vol. 22, Issue 4, Dec. 1996.

"Default English Stopwords"; downloaded from http://www.ranks.nl/tools/stopwords.html; accessed Oct. 6, 2011.

Levenshtein, V.; "On the Minimal Redundancy of Binary Error-Correcting Codes"; Information and Control; vol. 28, No. 4; 1975; pp. 268-291.

Kernighan, M. et al.; "A Spelling Correction Program Based on a Noisy Channel Model"; COLING'90 Proceedings of the 13th Conference on Computational Linguistics ; vol. 2; 1990.

Garside, R.; The Computational Analysis of English: A Corpus-Based Approach; Longman; 1987; London, England.

Baeza-Yates, R. et al.; "Modern Information Retrieval"; Addison-Wesley; 1999, Boston, Massachusetts; pp. 118-119.

* cited by examiner

SELF LEARNING CONTEXTUAL SPELL CORRECTOR

BACKGROUND

Spell correction is a technique that changes the misspelling of a word or a phrase to the correct one. It can be applied to many scenarios, such as document editing, search query suggestion, bidding keyword correction, etc. In one scenario, this technique serves as an assistant that helps a user to avoid typos. User interaction is usually needed to select an appropriate word from a list of candidates generated by a spell correction algorithm. In this scenario, spell correction precision is not strict. However, in other scenarios, the spell correction is performed automatically on a batch of words; no human interaction is involved. Hence, high precision is needed in order to ensure trustable results. In one example, automatic spell correction is used to correct the bidding keywords submitted by advertisers.

Unfortunately, existing spell correction technology fails to provide high precision for automated spell correction. Moreover, current spell correction solutions usually require training data and a dictionary for each language. When the spell corrector is used with a new language, the model trained from past data and an old dictionary may not be applicable. New training data and dictionaries for each language has to be applied which adds substantial development time and cost of current spell correctors.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Embodiments of the invention are directed to a self learning contextual spell corrector. The spell corrector receives a group of keywords and forms a word list containing the words from the keywords. The spell corrector may find various misspelling types by analyzing the words themselves in the word list; external resources such as training data or dictionaries are not utilized. Example misspelling types discoverable and correctable by the spell corrector include word connection (a missing space between words), word misspelling (e.g., letters reversed, extra letter inserted, letter missing, etc.), and word separation (space erroneously inserted in a word).

Many of the attendant features will be more readily appreciated as the same become better understood by reference to the following detailed description considered in connection with the accompanying drawings.

BRIEF DESCRIPTION OF THE DRAWINGS

Like reference numerals are used to designate like parts in the accompanying drawings.

DETAILED DESCRIPTION

Figure 1:
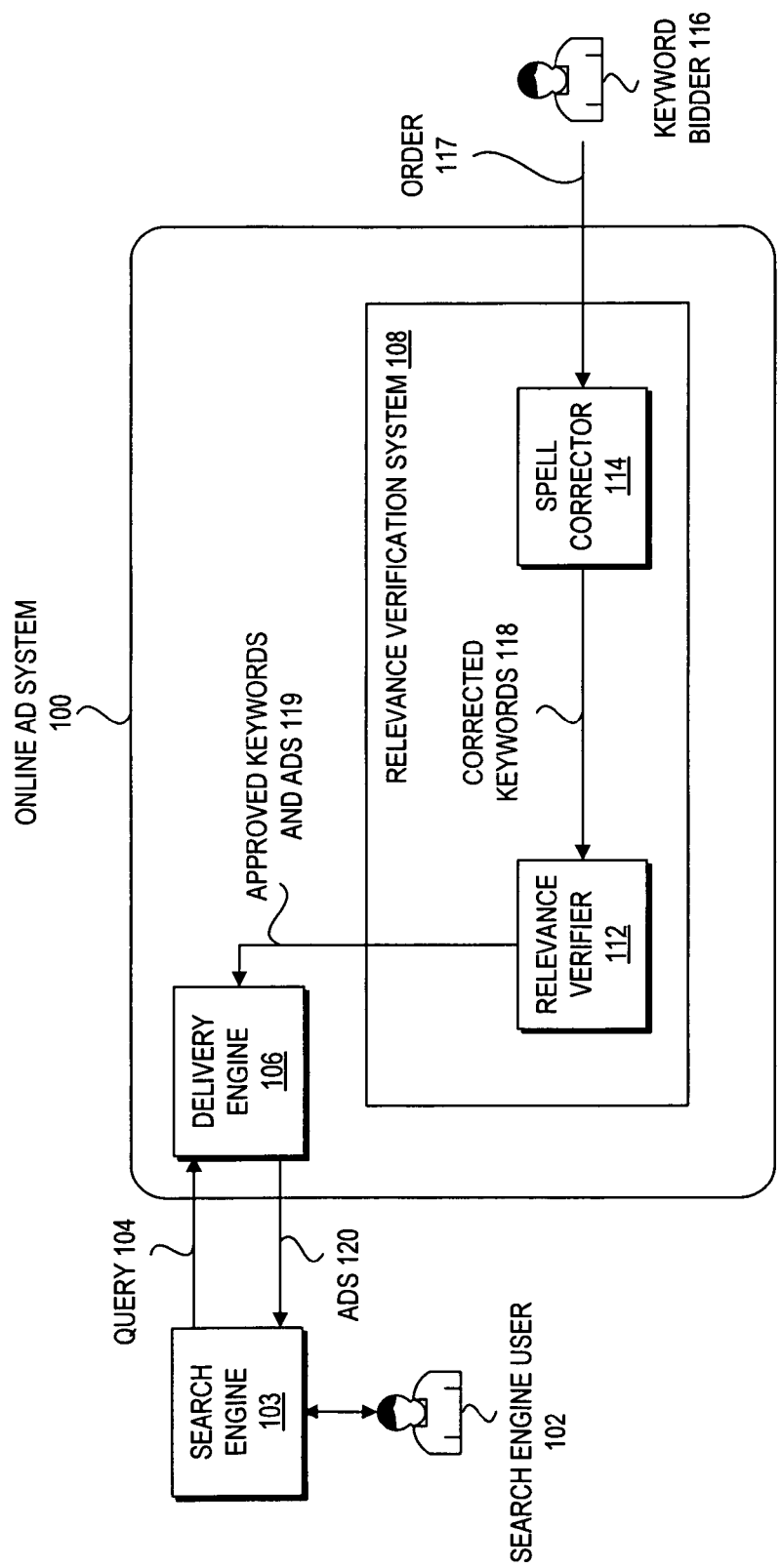
FIG. 1 is a block diagram of an online advertisement system in accordance with an embodiment of the invention.

The detailed description provided below in connection with the appended drawings is intended as a description of the present examples and is not intended to represent the only forms in which the present examples may be constructed or utilized. The description sets forth the functions of the examples and the sequence of steps for constructing and operating the examples. However, the same or equivalent functions and sequences may be accomplished by different examples.

Online advertisement ("ad") systems, such as Microsoft® adCenter, deliver relevant ads to users when they are conducting Internet searches using a search engine, such as Microsoft Live. An online advertisement system may include a relevance verification system that checks the relevance between bidding keywords and advertisements and matches ads that are relevant to submitted keywords. A single keyword may include one or more words. When a searcher enters a search string into the search engine, the search results may include results (i.e., ads) that have been paid for by keyword bidders (e.g., advertisers).

Misspelling is one of the common practices of keyword expansion used by advertisers to develop a comprehensive Search Engine Marketing (SEM) campaign. Bidding keywords are first corrected before doing relevance verification to avoid false rejection. Since there are millions of keywords submitted, it is not feasible to review the bid keywords manually and a backend batch algorithm is desired to perform the spell correction. The common spelling checker used in search query correction has a relatively high miss and error rate which is insufficient for an automated keyword bidding scenario. Such spell checkers also usually rely on training data for each language, which brings more cost for data preparation and algorithm tuning.

In a typical keyword bidding scenario, advertisers group keywords together in an "order". For example, an order may include 5 bidding keywords: "air force loans", "ai force loans", "ai rforce loads", "ai4 force loans", and "ai5 force loans". It will be appreciated that the phrase "air force loans" may be referred to as a single keyword having three separate words "air", "force", and "loans".

Embodiments herein utilize the context and correlations within the order to perform spell correction. Moreover, since knowledge within the group of keywords is utilized, no training data and dictionary specific for each language is required. Embodiments of the spell corrector herein may be referred to as a "self learning" spelling corrector. Self learning means the knowledge is gained from the group of words (i.e., the order) itself and afterwards such knowledge is applied back to correct the same group of words.

Embodiments herein take the order as a whole, identify and analyze the relationship between these keywords, and give the appropriate correction. In the example order above, embodiments herein give the appropriate spell correction "air force loans" for all misspelled keywords in the order. By utilizing the knowledge within the keyword group, embodiments herein have improved performance over current solutions. Embodiments herein take focused and reliable context information inside the order to make the correction which is more accurate than taking general word correlation with external sources.

Embodiments of the spell corrector described herein may be used in a variety of applications. Besides online ad systems, embodiments herein may be applied to search engines to correct misspelled search queries. A search engine query log includes data that may be fed into the spell corrector described herein to find misspelled words.

FIG. 1 shows an online advertisement system 100 in accordance with an embodiment of the invention. In one embodiment, one or more components of system 100 may be implemented by computer readable instructions executable by one or more computing devices. An example computing device is discussed below in conjunction with FIG. 7.

A keyword bidder 116, such as an advertiser, submits order 117 to the online ad system 100. Keyword bidder 116 may use automated tools to generate common misspellings for a particular keyword and submit the keyword and its misspellings together in order 117. One or more orders 117 may be submitted in an automated fashion.

At system 100, order 117 is received by relevance verification system 108 which includes a relevance verifier (RV) 112 and a spell corrector 114. The group of keywords in the order 117 is provided to spell corrector 114. Spell corrector 114 analyzes the keywords in order 117 and provides corrected keywords 118 to relevance verifier 112. In one embodiment, corrected keywords 118 include a mapping of the submitted keywords to their corrections (if a correction is applicable).

Corrected keywords 118 are used to calculate the relevance between keywords and ads. The submitted order 117 contains not only the keywords, but also the ads keyword bidder 118 would like to bid on. Usually the order is a cross-join of keywords and ads to form the bidding relationship for RV 112 to check. RV 112 takes one keyword and one ad and decides whether the keyword is relevant to the ad.

Relevance verification system 108 runs in the backend and acts as a door-keeper. Once the submitted associations (keyword and ad) are approved by system 108, a delivery engine 106 matches a user query with the submitted keywords on the fly.

Relevance verifier 112 checks the relevance of a corrected keyword with an advertisement in the same order. If RV 112 determines they are relevant to each other, the approved associations of keywords and ads 119 are made available to delivery engine 106.

When a search engine user 102 submits a query 104 to a search engine 103, query 104 is forwarded to delivery engine 106. User query 104 is first matched to the bidding keywords that are relevant to query 104. After that, the ads that are bid on the keywords are retrieved and ranked by delivery engine 106 before being displayed to user 102. Relevant ads 120 are sent to search engine 103 to be displayed to search engine user 102 along with the search engine results. In some instances, ads 120 may also be referred to as paid search results.

It will be noted that the original keywords that are submitted by keyword bidders 116 are matched with the user query, instead of matched to the corrected keywords. Keyword bidders 116 bid on a misspelled keyword so that the ads are shown when user 102 types the misspelled query. However, relevance verification system 108 relies on spell corrector 114 to first correct the keywords so that the association between keywords and ads can be made.

Figure 2:
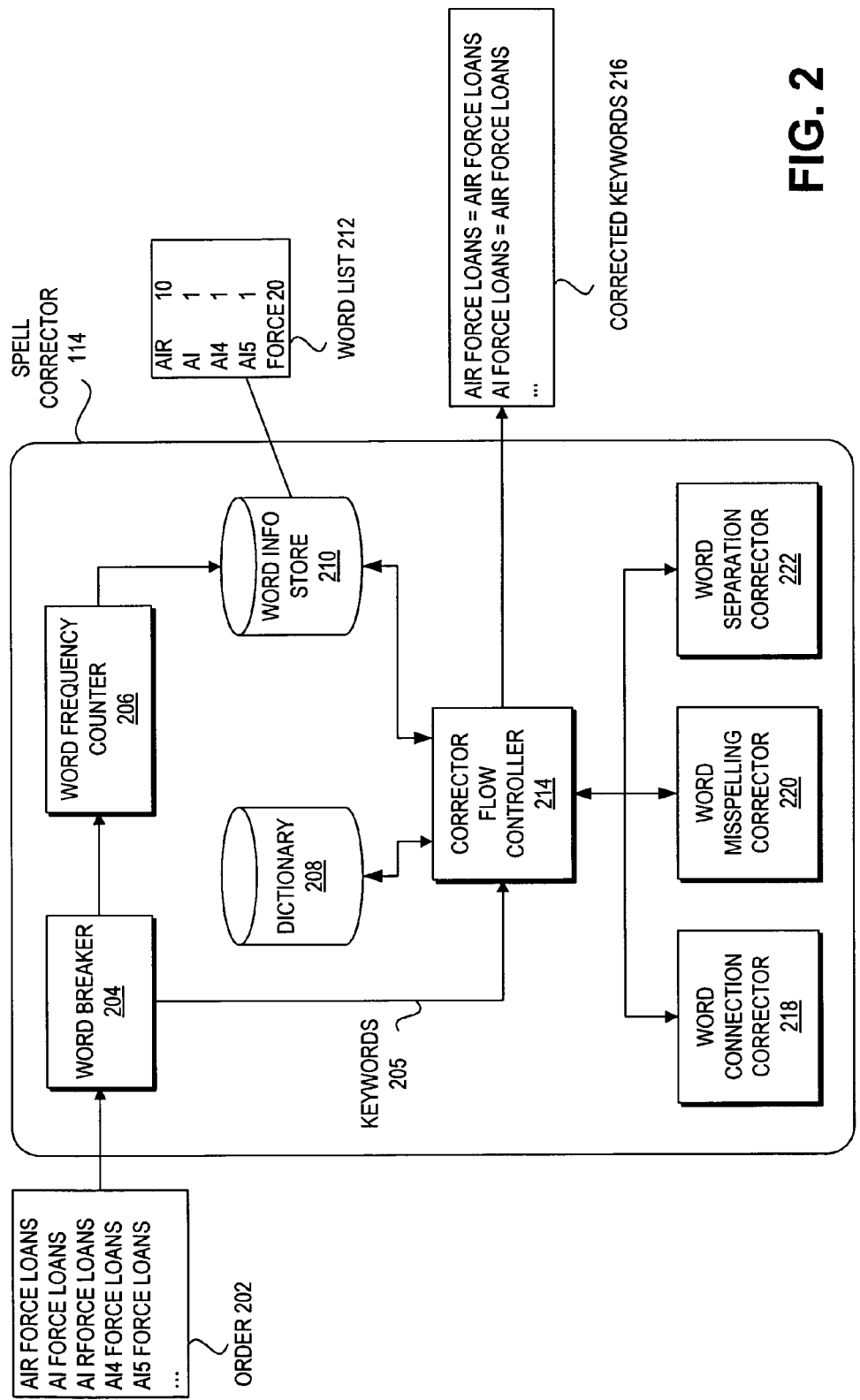
FIG. 2 is a block diagram of a spell corrector in accordance with an embodiment of the invention.

Turning to FIG. 2, an embodiment of spell corrector 114 is shown. Spell corrector 114 receives an order 202 and corrects the misspelled keywords in order 202. The corrected keywords 216 are then output. Spell corrector 114 may utilize information in order 202, such as word frequency, misspelling variations, keyword relationships, and word context to build keyword corrections. Various misspelling types are used together based on information inside order 202. In one embodiment, spell corrector 114 and/or its components discussed below may be implemented by computer readable instructions executable on a computing device.

A word may contain several types of misspellings such as word misspelling, word connection, and word separation.

In word misspelling, a keyword includes one or more words, each of which may be misspelled. Below are example word misspellings using the word "investment":
 a) letter insertion, such as "invest6ment",
 b) letter deletion, such as "investent",
 c) letter substitution, such as "8nvestment",
 d) letter reversion, such as "investmetn", and
 e) any combination of the above, such as "invest6metn" which is a combination of letter insertion and letter reversion.

In word connection misspellings, a space is missing between two words. For example, "airforce" instead of the correct "air force". As used herein, a word possibly having a connection error may be referred to as a "connection word".

In work separation misspellings, one or more spaces have been incorrectly inserted into a word. For example, "pay day" instead of the correct "payday".

Embodiments of spell corrector 114 utilize several observations of keywords within an order. It will be appreciated that these observations pertain to knowledge that may be gained by analyzing the order itself without the necessity of information external to the order. For example, advertisers often bid correct keywords and misspelled keywords together in a single order. In most cases, the frequency of the correct keyword (or word in a keyword) is much larger than any misspelled keyword/word. In the previous example, "air" may appear 100 times while "ai5" may appear one time in the order. The misspelled variations of a correctly spelled keyword/word have low frequency within the order.

Also, the correct part of a keyword can be matched in other keywords which are usually very close in the submitted order. Two keywords are considered close in the order when they are near in position or they are close in sequence in the order. Keyword bidders usually group the related keywords together within an order. For example, take four keywords: 1) Micsoft, 2) Microsoft, 3) Office, and 4) Offce. Related keywords are usually placed together such as keywords 1 with 2 and 3 with 4 instead of randomly placing them in the order. Hence, embodiments herein can take the distance between two keywords in the order into consideration.

In another observation, there is usually a small edit distance between a misspelled keyword (or word) and the correct keyword/word. Edit distance may include classic edit distance or spatial edit distance. Classic edit distance is the number of operations required to transform one string of characters into another string of characters. Unlike the classic edit distance, spatial edit distance also takes spatial distance of the two letters on the keyboard into consideration. For example, "ai4" is more likely to be corrected to "air" instead of "aim" since the character "4" is physically nearer to "r" on the keyboard than "m". People are more likely to type a wrong letter which is nearer to the correct one on a keyboard. In the "air" example above, the classic edit distance algorithm results in a 1 for both "ai4" and "aim" but spatial edit distance can make a differentiation. In embodiments of computations discussed below, classic edit distance may be used. However, alternative embodiments may use spatial edit distance in place of classic edit distance; in such cases, a threshold associated with the computation may change as well.

Figure 3:
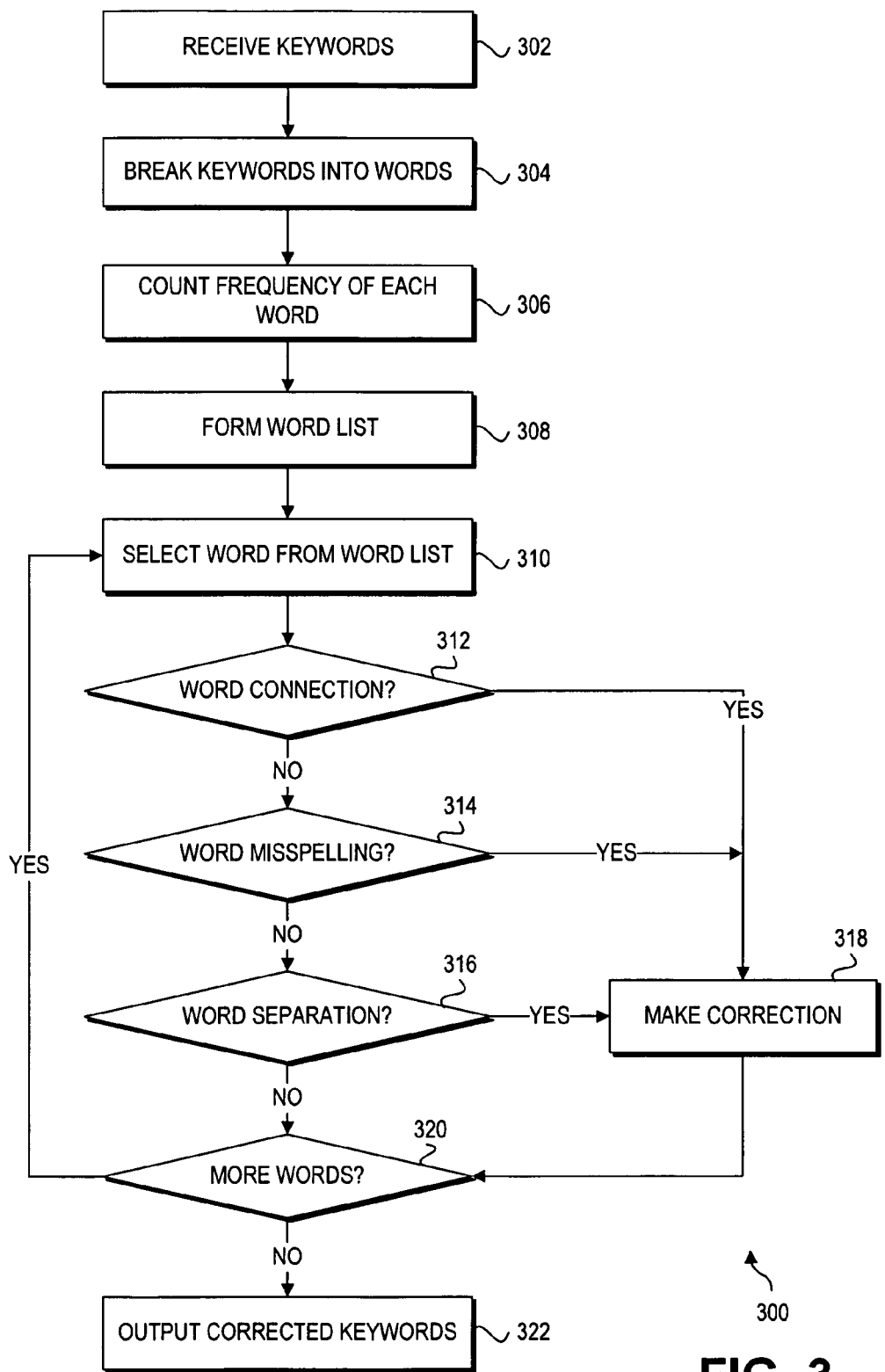
FIG. 3 is a flowchart showing operations of a spell corrector in accordance with an embodiment of the invention.

Turning to FIG. 3, a flowchart 300 shows operations of spell corrector 114 in accordance with an embodiment of the invention. However, one skilled in the art having the benefit of this description will appreciate that operations of flowchart 300 are not limited for use with spell corrector 114 as shown in FIG. 2. In one embodiment, at least a portion of flowchart 300 may be implemented by computer readable instructions executable by one or more computing devices.

Starting with operation 302, an order having keywords is received at spell corrector 114. For example, in FIG. 2, order 202 includes keywords "air force loans", "ai force loans", "ai rforce loans", "ai4 force loans", "ai5 force loans", etc. In one embodiment, the keyword bidder has intentionally included misspellings of "air force loans" so that misspelled search engine queries may be paired with ads relevant to "air force loans."

Next, in operation 304, any keywords that include phrases (i.e., multiple words) are broken into individual words. In FIG. 2, a word breaker 204 breaks keywords into individual words. For example, keyword "air force loans" is broken into three words "air", "force", and "loans". It will be appreciated that some orders may include keywords that are themselves single words and thus do not require breaking.

Next, in operation 306, the frequency of each word in the order is counted. In FIG. 2, the broken keywords are sent to word frequency counter 206 for counting. Usually, the word frequency of the misspelled form is much smaller than that of the correct form. For example, "air" will likely appear many more times in order 202 than "ai4".

After operation 306, the logic proceeds to operation 308 where the individual words are formed into a word list. In one embodiment, the word list is sorted by frequency decreasingly. In FIG. 2, word list 212 is formed by frequency counter 206 and stored in word information store 210. In one embodiment, word list 212 is stored as a table where a table row includes a word and its frequency in order 202. The words are sorted decreasingly by frequency to aid in applying the correctors described below.

As shown in FIG. 2, in one embodiment, the words are first grouped by their classic edit distance. In another embodiment, the words may be grouped by spatial edit distance. Within each group, the words are sorted according to their frequency. Embodiments below consider whether the low frequency words may possibly be corrected to the high frequency words.

Proceeding to operation 310, a word from word list 212 is selected. As will be described below, the logic iterates through each word in word list 212 and applies the various correctors. In the discussions below, the word under analysis is referred to as the "given word."

In one embodiment, the first word selected is from the top of word list 212 and thus is a word with a high frequency in order 202. The logic iterates down word list 212 for each next word and thus the logic works from high frequency words to low frequency words.

In the embodiment of FIG. 2, a corrector flow controller 214 receives a word from word list 212. Corrector flow controller 214 then applies word connection corrector 218, word misspelling corrector 220, and word separation corrector 222 to the word as applicable. In applying the correctors, corrector flow controller 214 may utilize information from word information store 210. It will be appreciated that other types of correctors may be added to spell corrector 114 and embodiments of spell corrector 114 do not necessarily include all correctors 218, 220, and 222. It will also be appreciated that embodiments of the invention are not limited to the order that the correctors 218, 220, and 222 are applied in the discussion below.

Also, information from a dictionary 208 may be used by correctors 218, 220, or 222. Dictionary 208 stores words from the word list that have been already corrected or deemed correct by one of the correctors. For example, spell corrector 114 may determine "air" is a correct spelling and store "air" in dictionary 208. When "air" is encountered again in "airforce" during word separation analysis, then word separation corrector 222 can use the knowledge that "air" is a correct spelling from dictionary 208. In one embodiment, a new dictionary is used for each order, a dictionary is not used across orders.

In one embodiment, dictionary 208 may serve as learned knowledge from past orders. However, since the context varies between orders, the knowledge should be only taken as one factor of determining whether the word is correct or not. Sometimes, even if the word itself is correct, it is still possible that the word is a typo when it is used in a phrase.

Next, in operation 312, the logic determines if the given word is a connection of several words (i.e., a word connection misspelling). If the given word is a word connection misspelling ("yes" branch), then the logic proceeds to operation 318 to make the correction to the given word. In one embodiment, corrector flow controller 214 uses word connection corrector 218 to find any connection errors and to make appropriate corrections to the word. This correction knowledge is retained by corrector flow controller 214 to be applied to order 202 in operation 322 (discussed below). In one embodiment, the corrected word is added to dictionary 208.

In one embodiment of operation 312, the logic determines whether the given word can be broken into several words that are in the word list. Moreover, if a portion of the given word cannot be exactly matched to another word in the word list, the word may still be considered a match if the edit distance (e.g., classic or spatial) is small. This handles the case in which word misspelling and word connection is mixed.

A connection confidence score may be calculated to measure the possibility of a connection correction. If the connection confidence score is above a threshold, then the logic applies a connection correction and breaks the connection word into its individual words. For example, "airforceloans" may be corrected to "air force loans." An embodiment of calculating the connection confidence score is discussed below.

In operation 312, if the logic determines that there is not a word connection error ("no" branch), then the logic proceeds to operation 314 to determine if misspelling correction should be applied. In one embodiment, the logic determines if the word meets one or more misspelling criteria (examples below). If the misspelling criteria are met, then the logic determines if the given word can be corrected to another word in the word list and makes the correction (operation 318). In one embodiment, the corrected word is added to dictionary 208.

Word misspelling may be corrected by selecting the word in the word list that has the highest misspelling confidence score in the word list that exceeds a threshold. An embodiment of calculating a misspelling confidence score is discussed below. In one embodiment, corrector flow controller 214 uses word misspelling corrector 220 to find word misspellings and make corrections.

If misspelling correction is not applied ("no" branch) then the logic proceeds to operation 316 to determine if the given word has a word separation error. Word separation may be found by merging the given word with another word in the word list to create a candidate merged word. The logic then attempts to match the candidate merged word with another word in the word list. Word misspelling may also be considered when correcting for word separation errors. An embodiment of calculating a separation confidence score for word separation is discussed below. In one embodiment, corrector flow controller 214 uses word separation corrector 222 for finding word separation errors and make corrections.

If a word separation error is found, then the logic proceeds to operation 318 to make the correction ("yes" branch). In one embodiment, the corrected word is added to dictionary 208. If no separation error is found ("no" branch), then the logic proceeds to operation 320. It will be appreciated that if the logic does not find a word connection, a word misspelling, or a word separation error, then the given word is deemed spelled correctly. In one embodiment, such a word deemed spelled correctly is not added to dictionary 208 since the word never achieved a high confidence score by one of the correctors.

In operation 320, the logic determines if there are more words in the word list to be analyzed. When more words remain ("yes" branch), then the logic returns to block 310 to select the next word in the word list.

If there are no more words for analysis ("no" branch), then the logic proceeds to block 322 to output the corrected keywords. Corrector flow controller 214 takes keywords 205 from word breaker 204 and matches keywords 205 to any spelling corrections. In one embodiment, the corrected keywords are output as corrected keywords 216 as shown in FIG. 2. Corrected keywords 216 shows the received keyword from order 202 and the corresponding corrected keyword. For example, "ai force loans" corrects to "air force loans" because spell corrector 214 determined that "ai" corrects to "air" and "force" and "loans" are correct in the received keyword. Corrected keywords 216 may be provided to relevance verifier 112.

Figure 4:
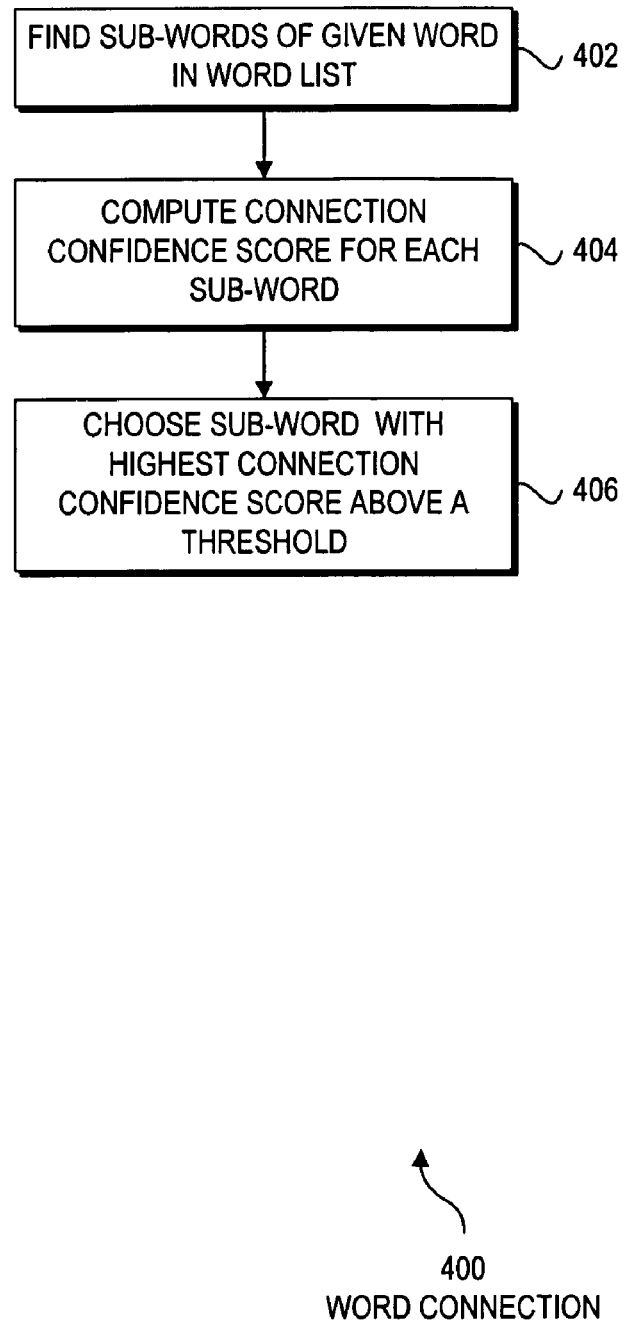
FIG. 4 is a flowchart showing operations of a word connection corrector in accordance with an embodiment of the invention.

Turning to FIG. 4, a flowchart 400 shows operations of word connection corrector 218 in accordance with an embodiment of the invention. In one embodiment, word connection corrector 218 determines whether the word can be separated into two or more words in the word list. Corrector 218 finds all the possible matching word breakings in the word list (using word information store 210). In the ideal case, all the words inside the connection word should be found in the word list itself. However, in some cases, word misspelling and word connection is mixed. There may be some misspellings inside the connection word, so a small edit distance (e.g., classic or spatial) is considered between parts of the connection word and words in the word list.

In one embodiment, a connection confidence score is calculated to measure the possibility of a connection correction. A higher connection confidence score for a word indicates the higher possibility that the word actually includes two or more words from the word list. If the confidence score is above a threshold, then the word is considered a connection word and is corrected to its individual words from the word list.

Starting in operation 402, the word list is searched for similar sub-words of the given word. A sub-word is a portion of a word. For example, "air" is a sub-word of "airforce".

In one embodiment, a word from the word list is considered a sub-word of the given word when: a) the classic edit distance between the sub-word and the corresponding part of the connection word is not greater than a threshold (e.g., 2), and b) the ratio (classic edit distance:sub-word length) is less than or equal to a threshold (e.g., 0.25). Alternative embodiments may use spatial edit distance in place of classic edit distance (and different thresholds) for sub-word determination.

After the logic finds sub-words of the given word, the logic computes a connection confidence score for each possible sub-word (operation 404). The logic then picks the sub-word with the highest connection confidence score above a threshold (operation 406). In one embodiment, the connection confidence score threshold is 0.5. The given word may then be corrected by separating the given word into its sub-words as found in the word list. If no sub-word exceeds the threshold, then the logic determines that the given word does not have a word connection misspelling type.

In one embodiment, the connection confidence score may be calculated as follows:

$$ConConfScore = \frac{AvgFreq - ConnFreq}{AvgFreq} \times \alpha + \sum_{i=1}^{n} \frac{LenScore_i}{1 + EditDist_i} \times \left(1 - \frac{EditDist_i}{BreakWordLen_i}\right) \times (1 - \alpha)$$

where n is the number of sub-words in the connection word, i is the ith sub-word of the connection word, Connection Frequency ("ConnFreq") is the frequency of the connection word to be split in the word list, Edit Distance ("EditDist") is the classic edit distance of the given word to the ith sub-word, Break Word Length ("BreakWordLen") is the word length of the ith word that is broken from the connection word (i.e., the sub-word), and, in one embodiment, a weighting factor ("α") may be set to 0.4.

Average Frequency ("AvgFreq") is defined by:

$$AvgFreq = \frac{1}{n}\sum_{i=1}^{n} BreakWordLen_i$$

The length of a broken word is also a factor in the confidence score (the broken word should not be too short or too long). A Broken Word Length Score ("LenScore") may be defined as follows:

$$LenScore = \begin{cases} 0.4, & \text{if } BreakWordLen_i = 1 \\ \dfrac{BreakWordLen_i}{LowLimit}, & \text{if } BreakWordLen_i < LowLimit \\ 1.0, & \text{if } LowLimit \le BreakWordLen_i \le UpperLimit \\ 1.0 - \dfrac{BreakWordLen_i - UpperLimit}{UpperLimit}, & \text{if } BreakWordLen_i > UpperLimit \end{cases}$$

In one embodiment, LowLimit is set to 4 and UpperLimit is set to 8.

Figure 5:
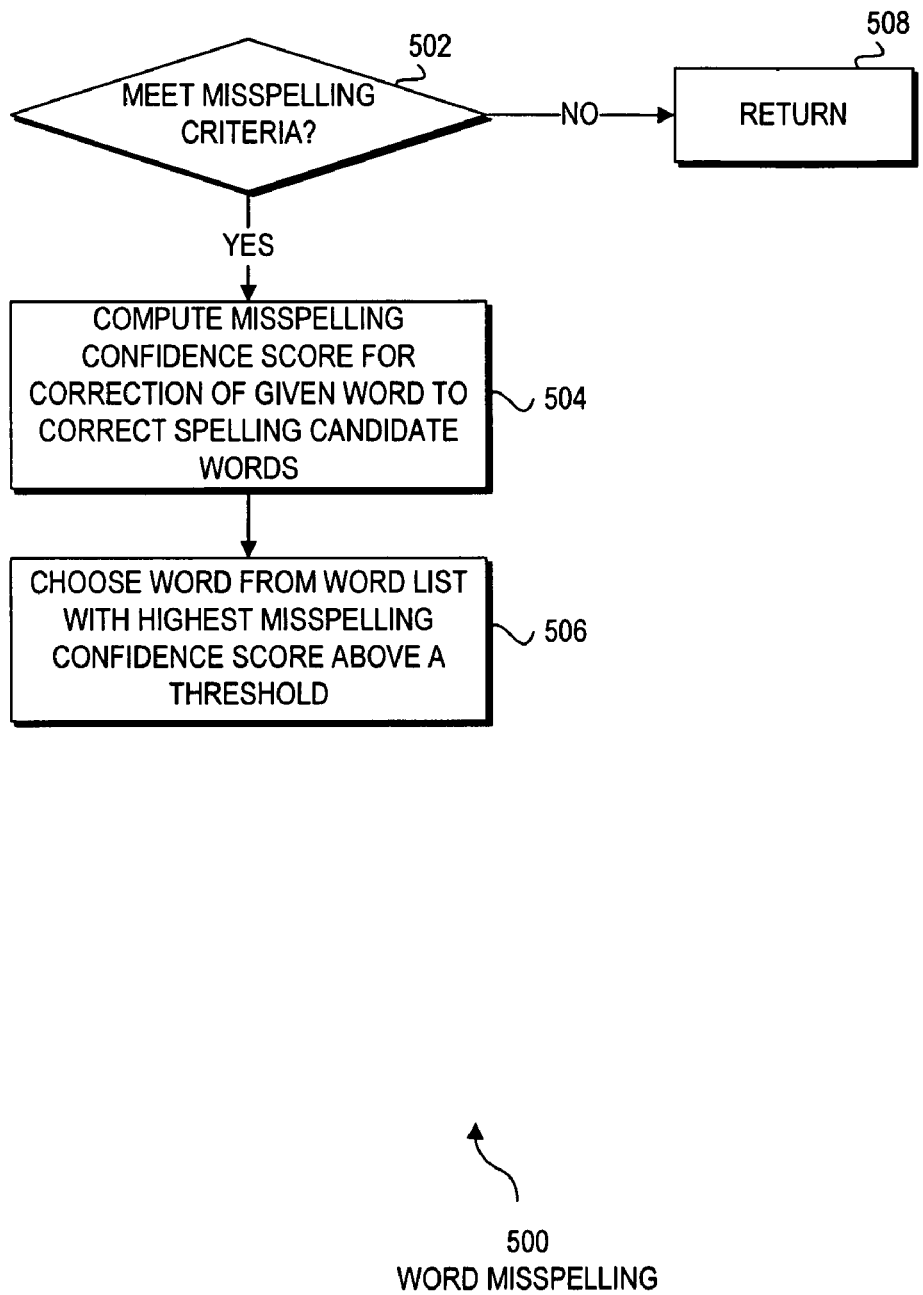
FIG. 5 is a flowchart showing operations of a word misspelling corrector in accordance with an embodiment of the invention.

Turning to FIG. 5, a flowchart 500 shows operations of word misspelling corrector 220 in accordance with an embodiment of the invention. In one embodiment, word misspelling corrector 220 determines whether the word is misspelled and should be corrected to another word in the word list. Given two words from the word list, $W_c$ (i.e., correct spelling candidate word from word list) and $W_m$ (i.e., possibly misspelled given word), if $W_m$ is likely to be corrected to $W_c$, $W_m$ should meet the below misspelling criteria:
  a) the frequency of $W_c$ is larger than that of $W_m$,
  b) stemming forms of $W_m$ and $W_c$ are not the same (stemming reduces inflected (or derived) words to their root form; for example, the words "stemmed" and "stemming" have the same stemming form of "stem"),
  c) classic edit distance from $W_m$ to $W_c$ is less than a threshold (e.g., a threshold of 2),
  d) ratio of ($W_m$ word length:classic edit distance) is larger than or equal to a threshold (e.g., a threshold of 3), and
  e) $W_m$ is not in dictionary 208 or the frequency of $W_m$ is less than or equal to a threshold (e.g., a threshold of 6). Consulting dictionary 208 may avoid correcting two similar words when both words are actually correct (e.g., personal and personnel).

In the criteria above, embodiments of the invention may use spatial edit distance in place of classic edit distance; the thresholds when using spatial edit distance may change as well. When the above criteria are met for correcting the given word to a correct spelling candidate (i.e., for correcting $W_m$ to $W_c$) (operation 502), a misspelling confidence score of $W_m$ to $W_c$ is computed (operation 504). Otherwise, the misspelling correction is skipped (operation 508). The higher the misspelling confidence score, the more likely $W_m$ is actually misspelled and corrects to $W_c$. In one embodiment, when the misspelling confidence score exceeds a threshold of 0.5, then $W_m$ is considered misspelled and corrects to $W_c$ (operation 506).

If $W_m$ is likely to be corrected to several words $W_{c1}$, $W_{c2}$, ..., $W_{cn}$, in the word list based on the criteria list above, then the word $W_c$ in the word list having the highest misspelling confidence score and is above the threshold is selected as the correct spelling for the given word $W_m$. If no misspelling confidence score exceeds the threshold, then the logic determines that the given word does not have a word misspelling.

In one embodiment, the misspelling confidence score is calculated as follows:

$$MisConfScore = \frac{Freq_{w_c} - Freq_{w_m}}{Freq_{w_c}} \times \alpha + EDScore \times (1 - \alpha)$$

where $Freq_{Wc}$ is the word frequency of $W_c$ and $Freq_{Wm}$ is the word frequency of $W_m$. In one embodiment, a weighting factor ("$\alpha$") may be set to 0.6. In the misspelling confidence score, a Spatial Edit Distance Score ("EDScore") is defined as follows:

$$EDScore = \begin{cases} \dfrac{EDRate}{ReliableWordLen}, & \text{if } EDRate < ReliableWordLen - 1 \\ 1.0 - \dfrac{1.0}{EDRate}, & \text{else} \end{cases}$$

$EDRate = Len_{w_c}/SpatialEditDistance(w_c, w_m)$ where $Len_{Wc}$ is the length of $W_c$ and ReliableWordLen is the minimum length of a word treated as reliable. In one embodiment, ReliableWordLen is set to 8. ReliableWordLen means that if a word's length is larger than the edit distance by a certain amount, than the word is more likely a misspelling. EDScore is differentiated from EDRate when EDRate is small and EDScore is smooth when EDRate is large. For example, for EDRate 1 to 9 (where ReliableWordLen is set to 8), EDScore is computed as 1/8, 2/8, ..., 6/8, 6/7, 7/8, 8/9. ReliableWordLen is a threshold that the EDRate is larger than EDScore by enough to make the increase in EDScore small and gradually approaches 1 as EDRate increases.

In one embodiment, the calculation of spatial edit distance ("SpatialEditDistance") differs from classic edit distance in at least the following aspects:
  a) the edit distance for letter reversion is set to 1 instead of 2 as in classic edit distance (e.g., "nivestment" to "investement" has an edit distance of 1), and
  b) the distance of a letter on the keyboard from the correct letter is considered in the calculation. For example, the number of moves to reach the correct letter on a QWERTY keyboard is mapped in a grid (e.g., if the correct letter is "D", then letter "E" is one key away while the letter "G" is two keys away.)

Figure 6:
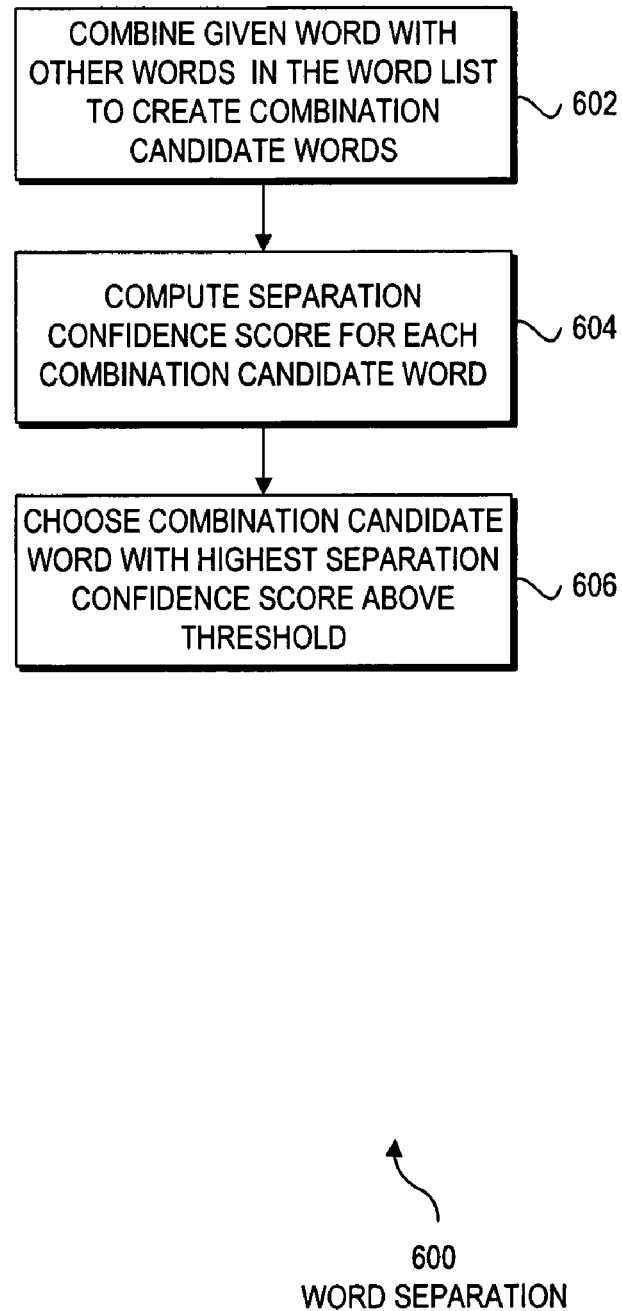
FIG. 6 is a flowchart showing operations of a word separation corrector in accordance with an embodiment of the invention.

Turning to FIG. 6, a flowchart 600 shows operations of word separation corrector 222 in accordance with an embodiment of the invention. In one embodiment, word separation corrector 222 determines whether the given word can be combined with another word in the word list to make a word in the word list. For example, the given word "pay" may be combined with "day" from the word list to make "payday" which is also in the word list.

In one embodiment, the given word is combined with the other words in the word list to create combination candidate words (operation 602). Next, a separation confidence score is computed for each combination candidate word (operation 604). The higher the separation confidence score, the more likely the word should be corrected to a combination of words in the word list. In one embodiment, word misspelling may also be taken into account.

When the separation confidence score exceeds a threshold, then the given word is considered a separation word and may be corrected to the combination candidate word (i.e., merge the given word with the other word from the word list) (operation 606). If more than one combination candidate word is above the threshold, then the combination candidate word with the highest separation confidence score is chosen. In one embodiment, the separation confidence score threshold is 0.5. If no separation confidence score exceeds the threshold, then the logic determines that the given word does not have a word separation error.

In one embodiment, a separation confidence score may be calculated as follows:

$$SepConfScore = \frac{1}{2}\sum_{i=1}^{2} \frac{Freq_{W_c} - Freq_{W_{si}}}{Freq_{W_c}} \times \alpha + LenScore_i \times (1 - \alpha)$$

where $FreqW_c$ is the frequency of the possible correct word in the word list (e.g., "payday"), $FreqW_{si}$ is the frequency of the given word and another word in the wordlist (e.g., "pay" and "day"). In this particular embodiment, separation is considered for two words only to be merged since i=1 to 2.

In one embodiment, LenScore may be calculated as follows:

$$LenScore_i = \begin{cases} \frac{WordLen_{W_{si}}}{LowLimit}, & \text{if } WordLen_{W_{si}} < LowLimit \\ 1.0, & \text{if } LowLimit \leq \text{if } WordLen_{W_{si}} \leq UpperLimit \\ 1.0 - \frac{(WordLen_{W_{si}} - UpperLimit)}{UpperLimit}, & \text{if } WordLen_{W_{si}} > UpperLimit \end{cases}$$

where, in one embodiment, a weighting factor ("α") is set to 0.6, LowLimit is set to 3, and UpperLimit is set to 6. Word Length ("WordLen") is the length of the combination word (i.e., the two words under consideration for merging). LowLimit and UpperLimit is the range most likely for WordLen.

Embodiments of the invention provide a self learning contextual spell corrector. The spell corrector makes corrections based on analysis of a group of words (e.g., an order). The analysis gains knowledge of the words based on the words themselves. Embodiments of the spell corrector do not rely on training data and are language independent.

Figure 7:
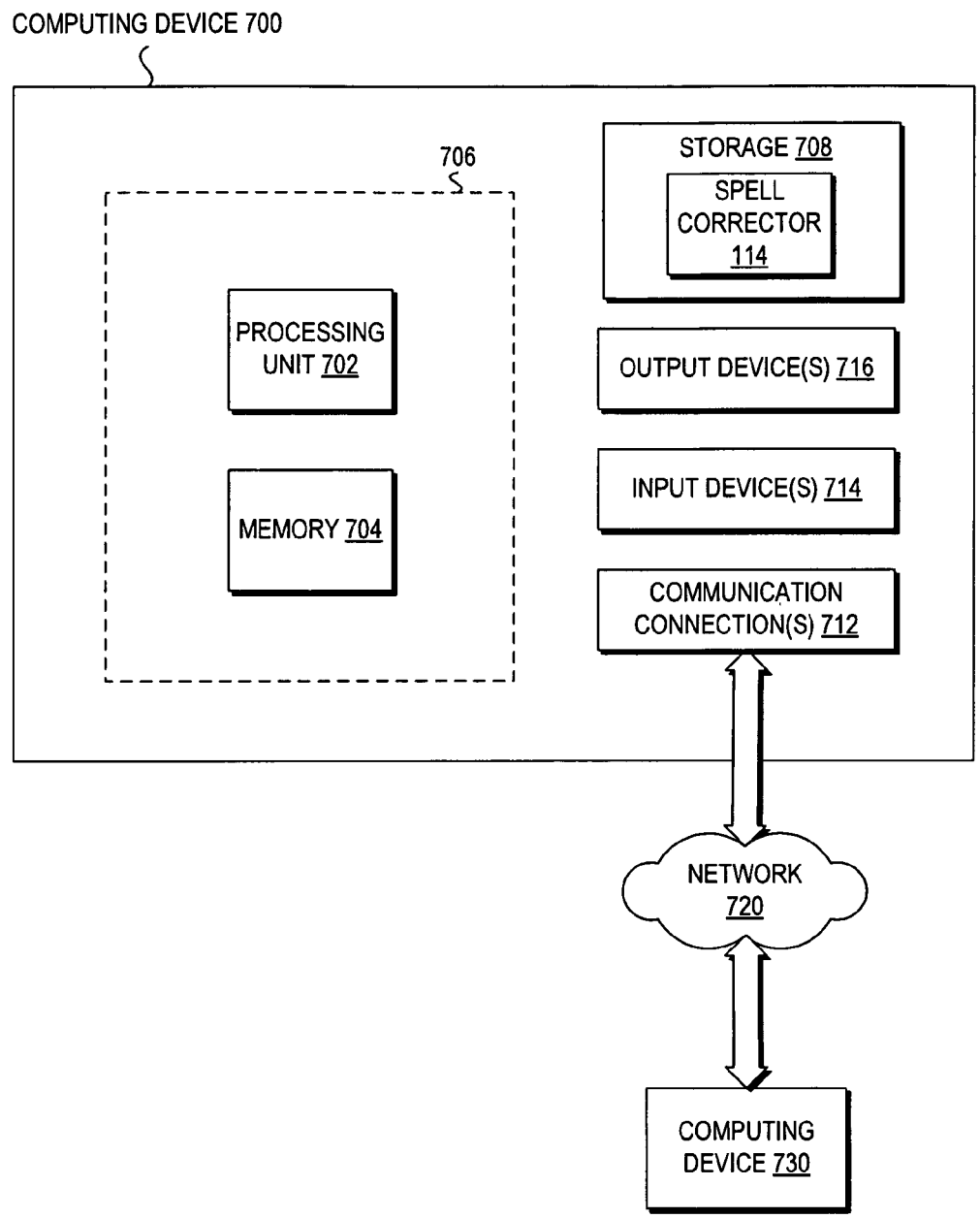
FIG. 7 is a block diagram of an example computing device for implementing embodiments of the invention.

FIG. 7 and the following discussion provide a brief, general description of a suitable computing environment to implement embodiments of the invention. The operating environment of FIG. 7 is only one example of a suitable operating environment and is not intended to suggest any limitation as to the scope of use or functionality of the operating environment. Other well known computing devices, environments, and/or configurations that may be suitable for use with embodiments described herein include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments of the invention are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 7 shows an example of a computing device 700 for implementing one or more embodiments of the invention. In one configuration, computing device 700 includes at least one processing unit 702 and memory 704. Depending on the exact configuration and type of computing device, memory 704 may be volatile (such as RAM), non-volatile (such as ROM, flash memory, etc.) or some combination of the two. This configuration is illustrated in FIG. 7 by dashed line 706.

In other embodiments, device 700 may include additional features and/or functionality. For example, device 700 may also include additional storage (e.g., removable and/or non-removable) including, but not limited to, magnetic storage, optical storage, and the like. Such additional storage is illustrated in FIG. 7 by storage 708. In one embodiment, computer readable instructions to implement embodiments of the invention may be in storage 708, such as instructions to implement spell corrector 114. Storage 708 may also store other computer readable instructions to implement an operating system, an application program, and the like.

The term "computer readable media" as used herein includes computer storage media. Computer storage media includes volatile and nonvolatile, removable and non-removable media implemented in any method or technology for storage of information such as computer readable instructions or other data. Memory 704 and storage 708 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 700. Any such computer storage media may be part of device 700.

Device 700 may also include communication connection(s) 712 that allow device 700 to communicate with other devices. Communication connection(s) 712 may include, but is not limited to, a modem, a Network Interface Card (NIC), an integrated network interface, a radio frequency transmitter/receiver, an infrared port, a USB connection, or other interfaces for connecting computing device 700 to other computing devices. Communication connection(s) 712 may include a wired connection or a wireless connection. Communication connection(s) 712 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, Near Field Communication (NFC), and other wireless media.

Device 700 may include input device(s) 714 such as keyboard, mouse, pen, voice input device, touch input device, infrared cameras, video input devices, and/or any other input device. Output device(s) 716 such as one or more displays, speakers, printers, and/or any other output device may also be included in device 700. Input device(s) 714 and output device(s) 716 may be connected to device 700 via a wired connection, wireless connection, or any combination thereof. In one embodiment, an input device or an output device from another computing device may be used as input device(s) 714 or output device(s) 716 for computing device 700.

Components of computing device 700 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 700 may be interconnected by a network. For example, memory 704 may be comprised of multiple physical memory units located in different physical locations interconnected by a network.

In the description and claims, the term "coupled" and its derivatives may be used. "Coupled" may mean that two or more elements are in contact (physically, electrically, magnetically, optically, etc.). "Coupled" may also mean two or more elements are not in contact with each other, but still cooperate or interact with each other (for example, communicatively coupled).

Those skilled in the art will realize that storage devices utilized to store computer readable instructions may be distributed across a network. For example, a computing device 730 accessible via network 720 may store computer readable instructions to implement one or more embodiments of the invention. Computing device 700 may access computing device 730 and download a part or all of the computer readable instructions for execution. Alternatively, computing device 700 may download pieces of the computer readable instructions, as needed, or some instructions may be executed at computing device 700 and some at computing device 730. Those skilled in the art will also realize that all or a portion of the computer readable instructions may be carried out by a dedicated circuit, such as a Digital Signal Processor (DSP), programmable logic array, and the like.

Various operations of embodiments of the present invention are described herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment of the invention.

The above description of embodiments of the invention, including what is described in the Abstract, is not intended to be exhaustive or to limit the embodiments to the precise forms disclosed. While specific embodiments and examples of the invention are described herein for illustrative purposes, various equivalent modifications are possible, as those skilled in the relevant art will recognize in light of the above detailed description. The terms used in the following claims should not be construed to limit the invention to the specific embodiments disclosed in the specification. Rather, the following claims are to be construed in accordance with established doctrines of claim interpretation.

What is claimed is:

1. A computer-implemented method comprising:
   receiving a group of keywords, wherein each keyword includes one or more words;
   forming a word list from the group of keywords, where the word list includes a list of each word in the group of keywords;
   determining that a first word in the word list is a misspelling of a second word in the word list by:
      determining correct spelling candidate words in the word list;
      computing misspelling confidence scores for correcting the first word to the correct spelling candidate words; and
      in at least one instance, choosing, as the second word, an individual correct spelling candidate word having a misspelling confidence score that exceeds a misspelling confidence score threshold and that has a highest misspelling confidence score;
   correcting the first word by spelling the first word like the second word; and
   outputting corrected keywords that include the corrected first word.

2. The method of claim 1, further comprising
   determining that another word in the word list is a combination of at least two other words in the word list; and
   correcting the another word by separating the another word into the at least two other words.

3. The method of claim 2 further comprising:
   finding matching words in the word list that match a portion of the another word; and
   computing connection confidence scores for the matching words;
   wherein the determining that the another word is a combination of the at least two other words is based on the connection confidence scores.

4. One or more computer-readable storage devices storing computer-readable instructions that, when executed by a processing unit, cause the processing unit to perform the method of claim 1.

5. A system comprising the one or more computer-readable storage devices of claim 4 and the processing unit.

6. The method of claim 1, wherein the misspelling confidence scores reflect spatial edit distances between the correct spelling candidate words and the first word.

7. A computer-implemented method comprising:
   receiving a group of keywords, wherein each keyword includes one or more words;
   forming a word list from the group of keywords, where the word list includes a list of each word in the group of keywords;
   determining that a first word in the word list is a portion of a second word in the word list by:
      combining the first word with other words in the word list to form combination candidate words;
      computing separation confidence scores for the combination candidate words; and
      in at least one instance, choosing, as the second word, an individual combination candidate word having a separation confidence score that exceeds a separation confidence score threshold and that has a highest separation confidence score;

correcting the first word by spelling the first word like the second word; and outputting corrected keywords that include the corrected first word.

8. The method of claim 7, further comprising:

breaking the group of keywords into the one or more words to form the word list; and counting a frequency of each word in the word list.

9. The method of claim 8, further comprising:

sorting the words in the word list by frequency.

10. The method of claim 7 wherein the group of keywords includes an order, wherein the keywords include bidding keywords for an online advertising system.

11. One or more computer-readable storage devices storing computer-readable instructions that, when executed by a processing unit, cause the processing unit to perform the method of claim 7.

12. A system comprising the one or more computer-readable storage devices of claim 11 and the processing unit.

13. A computer-implemented method comprising:

receiving an order including keywords for an online advertising system, wherein individual keywords include at least two words comprising a first word and a second word;

breaking the keywords into the at least two words;

forming a word list from the at least two words by sorting the at least two words decreasingly by frequency of occurrence in the order;

determining that correcting the first word to the second word meets misspelling candidate criteria, the misspelling candidate criteria including:

a frequency of occurrence of the second word is higher than a frequency of occurrence of the first word, stemming forms of the first word and the second word are not the same, an edit distance from the first word to the second word is less than a first threshold, a ratio of the length of the first word to the edit distance is larger than or equal to a second threshold, and the frequency of occurrence of the first word is less than a third threshold;

in an instance when the misspelling candidate criteria are met, computing a misspelling confidence score and correcting spelling of the first word using the second word when the misspelling confidence score exceeds a fourth threshold; and outputting corrected keywords that include the corrected first word.

14. The method of claim 13, further comprising:

determining that a another word in the word list is a combination of at least two other words in the word list that are sub-words of the another word; and correcting the another word by separating the another word into the at least two other words.

15. The method of claim 14 further comprising identifying a first one of the sub-words when:

an edit distance between the first sub-word and a portion of the another word is not greater than a fifth threshold, and a ratio of the edit distance to a sub-word length of the first sub-word is less than or equal to a sixth threshold.

16. The method of claim 13, further comprising:

determining that a third word in the word list is a sub-word of fourth word in the word list; and correcting the third word by spelling the third word like the fourth word.

17. One or more computer-readable storage devices storing computer-readable instructions that, when executed by a processing unit, cause the processing unit to perform the method of claim 13.

18. A system comprising the one or more computer-readable storage devices of claim 17 and the processing unit.

* * * * *

UNITED STATES PATENT AND TRADEMARK OFFICE
CERTIFICATE OF CORRECTION

PATENT NO. : 8,176,419 B2
APPLICATION NO. : 11/959946
DATED : May 8, 2012
INVENTOR(S) : Zhu et al.

Page 1 of 1

It is certified that error appears in the above-identified patent and that said Letters Patent is hereby corrected as shown below:

In column 14, line 31, in Claim 2, delete "comprising" and insert -- comprising: --, therefor.

In column 16, line 15, in Claim 14, delete "that a another" and insert -- that another --, therefor.

In column 16, line 28, in Claim 16, delete "fourth" and insert -- a fourth --, therefor.

Signed and Sealed this
Thirtieth Day of October, 2012

David J. Kappos
*Director of the United States Patent and Trademark Office*